US010401586B2

United States Patent
Henley et al.

(10) Patent No.: US 10,401,586 B2
(45) Date of Patent: Sep. 3, 2019

(54) TELECOMMUNICATIONS MODULES HAVING MULTIPLE BODY SECTIONS AND FORWARD FACING INPUT AND OUTPUT ADAPTERS

(71) Applicant: CORNING RESEARCH & DEVELOPMENT CORPORATION, Corning, NY (US)

(72) Inventors: Joshua David Henley, Fort Worth, TX (US); Diana Rodriguez, Fort Worth, TX (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 16/173,270

(22) Filed: Oct. 29, 2018

(65) Prior Publication Data

US 2019/0129116 A1    May 2, 2019

Related U.S. Application Data

(60) Provisional application No. 62/578,690, filed on Oct. 30, 2017.

(51) Int. Cl.
*G02B 6/44* (2006.01)
*G02B 6/42* (2006.01)
*G02B 6/38* (2006.01)

(52) U.S. Cl.
CPC ......... *G02B 6/4453* (2013.01); *G02B 6/3897* (2013.01); *G02B 6/4246* (2013.01); *G02B 6/4452* (2013.01)

(58) Field of Classification Search
None
See application file for complete search history.

(56) References Cited

U.S. PATENT DOCUMENTS

| 7,526,172 B2 | 4/2009 | Gniadek et al. |
| 7,526,174 B2 | 4/2009 | Leon et al. |
| 7,751,674 B2 | 7/2010 | Hill |
| 8,380,036 B2 | 2/2013 | Smith |
| 8,520,997 B2 | 8/2013 | Zimmel |
| 2011/0075968 A1* | 3/2011 | Cao ............. G02B 6/445 385/24 |
| 2011/0211799 A1* | 9/2011 | Conner ......... G02B 6/4471 385/135 |

(Continued)

FOREIGN PATENT DOCUMENTS

JP    2010-122527 A * 6/2010

*Primary Examiner* — Michael Stahl
(74) *Attorney, Agent, or Firm* — Grant A. Gildehaus (57) ABSTRACT

A fiber optic module for use in a fiber optic terminal. The fiber optic module includes a body having a front end, a first body section including a first group of adapters on the front end and a first fiber routing arm having a first fiber retaining element at a free end of the first routing arm, and a second body section in stacked alignment with the first body section, wherein the second body section includes a second group of adapters on the front end and a second fiber routing arm having a second fiber retaining element at a free end of the second routing arm. The first body section and the second body section define an internal volume containing an optical splitter. The fiber optic module may also include a handle coupleable to the first body section.

22 Claims, 10 Drawing Sheets

(56) References Cited

U.S. PATENT DOCUMENTS

| | | | |
|---|---|---|---|
| 2013/0230291 A1* | 9/2013 | Lichoulas | G02B 6/4452 385/135 |
| 2014/0029908 A1* | 1/2014 | Courchaine | G02B 6/44 385/135 |
| 2014/0314384 A1 | 10/2014 | Nair et al. | |
| 2015/0110442 A1 | 4/2015 | Zimmel et al. | |
| 2015/0355428 A1 | 12/2015 | Leeman et al. | |
| 2016/0011391 A1 | 1/2016 | Montalvo Urbano et al. | |
| 2017/0322384 A1* | 11/2017 | Burkett | G02B 6/3897 |

* cited by examiner

TELECOMMUNICATIONS MODULES HAVING MULTIPLE BODY SECTIONS AND FORWARD FACING INPUT AND OUTPUT ADAPTERS

This application claims the benefit of priority under 35 U.S.C. § 119 of U.S. Provisional Application Ser. No. 62/578,690 filed on Oct. 30, 2017 the content of which is relied upon and incorporated herein by reference in its entirety.

BACKGROUND

The present disclosure relates to telecommunications modules for use in telecommunications systems, and, more particularly, to telecommunications modules which are easily installed and removed from a module frame of a telecommunications terminal, closure, or other telecommunications hardware.

TECHNICAL BACKGROUND

Fiber optic terminals in a fiber optic network may be referred to as local convergence points (LCP), fiber distribution terminals (FDT), fiber distribution hubs (FDH), and the like. Such fiber optic terminals may be cabinets or enclosures which may house fiber connection points, splices, splitter modules, or other components. For example, a fiber optic terminal may include one or more splitter modules for splitting an optical signal from a network operator or service provider into several outgoing optical signals for distribution to subscribers. The fiber optic terminal provides a convergence point for management of the fiber optic cables and the respective optical signals between the network operator or service provider and the subscriber.

Figure 1:
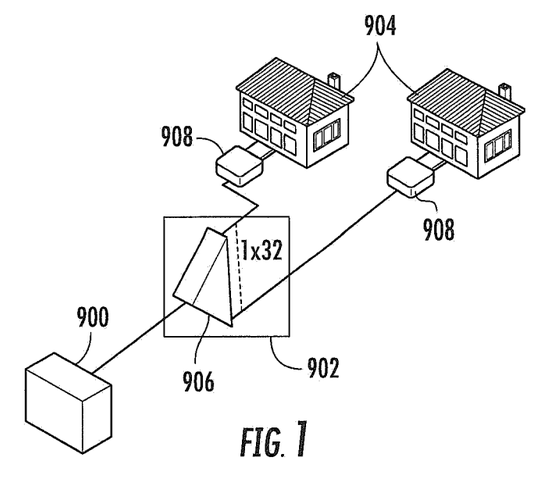
FIG. 1 is a schematic view of an embodiment of a centralized split fiber optic network.

Referring now to FIG. 1, fiber to the premises services, which includes single-family residences 904, multifamily residences, businesses, and other locations with high bandwidth requirements, have traditionally utilized a network architecture that relies on information transmitted from a central office 900 to a local convergence point 902 containing all of the optical network splitters 906 for this portion of the overall system. In most cases, the signal from the central office undergoes a 1×32 split at the local convergence point 902 and thirty-two outgoing fibers optic cables are connected directly or indirectly to the customer premises 904, for example, via an optical network terminal 908. While only one 1×32 splitter 906 is illustrated in the portion of the telecommunications network illustrated in FIG. 1, the local convergence point may have more than one splitter to split the incoming signals to the desired number of output signals. This network configuration is referred to as a centralized split network architecture.

In a centralized split architecture, the local convergence point 902, often called a fiber distribution hub or "FDH," is typically designed to service from 144 to 864 customers, but can service more or less customers depending on a particular installation. Traditional fiber distribution hubs provide for the management of input and output fiber cables, mounting of splitters 906, and fixed input and distribution fields that are factory configured to accommodate the maximum number of outgoing fiber optic cables. Due to the large number of customers serviced by a single local convergence point 902 in a centralized split architecture, the equipment can be quite large and insulation requirements for the local convergence point 902 can be extensive and costly. Permitting with the local municipality, deployment of underground cables, placement of a splice vault in concrete pad, and securing the equipment cabinet to the pad may be required when installing a local convergence point 902.

Figure 2:
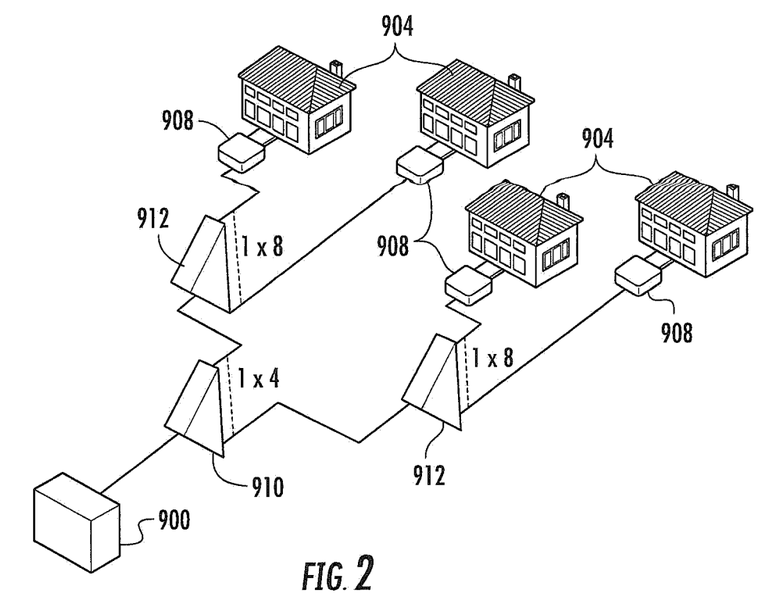
FIG. 2 is a schematic view of an embodiment of a distributed split fiber optic network.

To allow service providers a more modular and customizable fiber distribution architecture, many providers have moved from centralized split architectures to a distributed split architecture. FIG. 2 illustrates an example distributed split architecture that utilizes splitters 910, 912 at multiple locations in the architecture to achieve the desired split level. In FIG. 2, for example, a 1×4 splitter 910 is followed by two 1×8 splitters 912 to create bandwidth sharing equivalent to a single 1×32 splitter. As discussed above, each split location may include additional splitters. The deep positioning of splitters 910, 912 in a distributed split architecture results in stranding of splitter assets as the carrier awaits new subscribers on the network or take rates are initially low. While distributed split architectures are more modular and customizable, current fiber optic terminals, many of which are large, costly, and may require placement of a concrete pad, lack features and design which would be beneficial in deploying a cost-effective and user-friendly distributed split fiber optic network.

SUMMARY OF THE DETAILED DESCRIPTION

Embodiments disclosed herein provide for a fiber optic splitter module that has multiple body portions which each include a group of input and output adapters, a fiber routing arm, and a corresponding fiber routing surface on the handle. Thus, each group of input and output fibers coupled to the module are routed and grouped with input and output fibers associated with the relevant body portion. This may assist a technician with identification of fibers and remove or addition of fibers.

The module may also include a handle that includes the fiber routing surfaces that work with the fiber routing arms to route and protect fibers connected to the fiber optic splitter module. The adapters of the module are all located on a front face of the module to provide forward facing connectivity and ease of access for an operator. The handle is rotatable between a closed position in which the fiber routing surfaces route and protect the fibers and an open position in which the fibers are accessible to a technician.

In one embodiment, a fiber optic module for use in a fiber optic terminal includes a body having a front end, a first body section that includes a first group of adapters on the front end and a first fiber routing arm having a first fiber retaining element at a free end of the first routing arm, and a second body section in stacked alignment with the first body section, wherein the second body section includes a second group of adapters on the front end and a second fiber routing arm having a second fiber retaining element at a free end of the second routing arm. The first body section and the second body section define an internal volume that includes a splitter in the internal volume. The fiber optic module also includes a handle coupleable to the first body section.

In some embodiments, the handle includes a first fiber routing surface and a second fiber routing surface. The handle may be pivotable with respect to the first body section between an open position to allow access to the first and second fiber groups of adapters and a closed position wherein the first fiber routing surface is aligned with the first body section and the second fiber routing surface is aligned with the second body section. In some embodiments, the second fiber routing surface is removably coupled to the first fiber routing surface.

In some embodiments, the first fiber routing arm is aligned with the first group of adapters to route a first set of distribution fibers that are operably coupled to the first group of adapters. The first fiber retaining element may include a first fiber retaining loop and the first set of distribution fibers may pass through the first fiber retaining loop.

In some embodiments, the second fiber routing arm is aligned with the second group of adapters to route a second set of distribution fibers that are operably coupled to the second group of adapters. The second fiber retaining element may include a second fiber retaining loop and the second set of distribution fibers may pass through the second fiber retaining loop.

In some embodiments, the first fiber routing arm is removably coupled to the first body section and the second fiber routing arm is removably coupled to the second body section. The first and second fiber routing arms may be made of a compliant material.

In some embodiments, the first group of adapters includes at least one input adapter and a plurality of output adapters. The splitter may include an input fiber and a plurality of output fibers and the input fiber may be operably coupled to the at least one input adapter and at least some of the output fibers may be coupled to the plurality of output adapters. In addition, the second group of adapters may include a plurality of output adapters and at least some of the output fibers of the splitter may be coupled to the plurality of output adapters.

In some embodiments, the second group of adapters includes a greater number of output adapters than the first group of adapters. The input adapter may be spaced from the plurality of output adapters by a distance that is greater than a distance between adjacent output adapters of the plurality of output adapters. The distance between the input adapter and the plurality of output adapters may include an insignia.

In some embodiments, the first body section and the second body section are a single unitary member while in other embodiments the first body section and the second body section are separate members that are coupled together. The first body section includes a first portion of the internal volume and the second body section includes a second portion of the internal volume. The first and second portions are open to each other.

In some embodiments, the first body section includes a flange for securing the fiber optic module in a frame.

In another embodiment, a fiber optic module for use in a fiber optic terminal includes a body with a front end, a first body section having a first group of adapters on the front end, a second body section in stacked alignment with the first body section, wherein the second body section includes a second group of adapters on the front end, and wherein the first body section and the second body section define an internal volume. The internal volume may include a splitter. The fiber optic module may also include a handle that is coupleable to the first body section. The handle includes a first fiber routing surface and a second fiber routing surface, and the handle is pivotable with respect to the first body section between an open position to allow access to the first and second fiber groups of adapter and a closed position wherein the first fiber routing surface is aligned with the first body section and the second fiber routing guide is aligned with the second body section.

In some embodiments, the second fiber routing surface is removably coupled to the first fiber routing surface.

In some embodiments, the first body section includes a first fiber routing arm having a first fiber retaining element at a free end of the first routing arm, and the second body section includes a second fiber routing arm having a second fiber retaining element at a free end of the second routing arm.

In another embodiment, a fiber optic module for use in a fiber optic terminal includes a body that has a front end, a first body section comprising a first group of adapters on the front end and a first fiber routing arm having a first fiber retaining element at a free end of the first routing arm, and a second body section in stacked alignment with the first body section, wherein the second body section includes a second group of adapters on the front end and a second fiber routing arm having a second fiber retaining element at a free end of the second routing arm. The first body section and the second body section define an internal volume. The fiber optic module also includes a handle coupleable to the first body section.

In another embodiment, a method of forming a fiber optic module for use in a fiber optic terminal is described. The method includes operably coupling an input fiber of a splitter to an input adapter of a first group of adapters of a fiber optic module, operably coupling at least one output fiber of the splitter to an output adapter of the first group of adapters of the fiber optic module, operably coupling at least one output fiber of the splitter to an output adapter of a second group of adapters of the fiber optic module. The fiber optic module includes a first body section that includes the first group of adapters and the fiber optic module includes a second body section that has the second group of adapters. The first and second body sections are in stacked alignment and define an internal volume housing the splitter.

Additional features and advantages will be set forth in the detailed description which follows, and in part will be readily apparent to those skilled in the art. It is to be understood that the foregoing general description, the following detailed description, and the accompanying drawings are merely exemplary and intended to provide an overview or framework to understand the nature and character of the claims.

DETAILED DESCRIPTION

Reference will now be made in detail to the embodiments, examples of which are illustrated in the accompanying drawings. Whenever possible, like reference numbers will be used to refer to like components or parts.

Referring initially to FIGS. 3-6, an embodiment of a fiber optic module 10 for use in a fiber optic terminal, closure, or other telecommunications hardware is depicted in various configurations. The fiber optic module 10 includes adapters 12 for coupling connectorized input and output fibers 14, 16 to an optical element, such as an optical splitter 18 (FIG. 5), within the fiber optic module 10. The module 10 is configured to be removably placed in a frame 20 (see FIG. 11) or other area of a fiber optic terminal 22, closure, or other telecommunications hardware so that the adapters 12 are easily accessible to a technician. The form and function of the module 10 makes it easy to install and remove from telecommunications hardware and connections to the module 10 are easily accessible via the adapters 12. As such, the module 10 is versatile and useful in a wide variety of applications.

Figure 3:
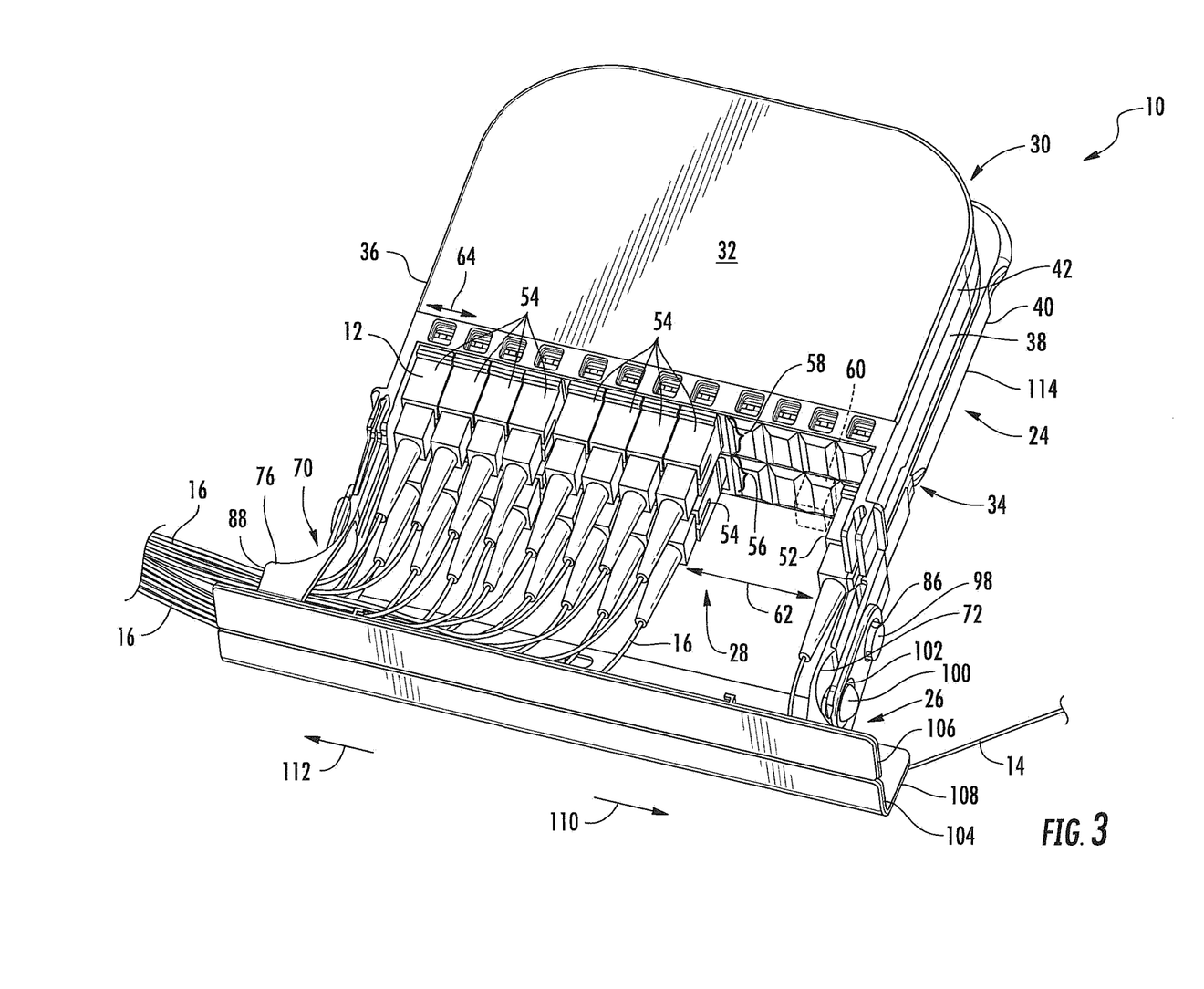
FIG. 3 is a perspective view of an embodiment of a fiber optic module for use in a fiber optic terminal in accordance with the present disclosure.
Figure 4:
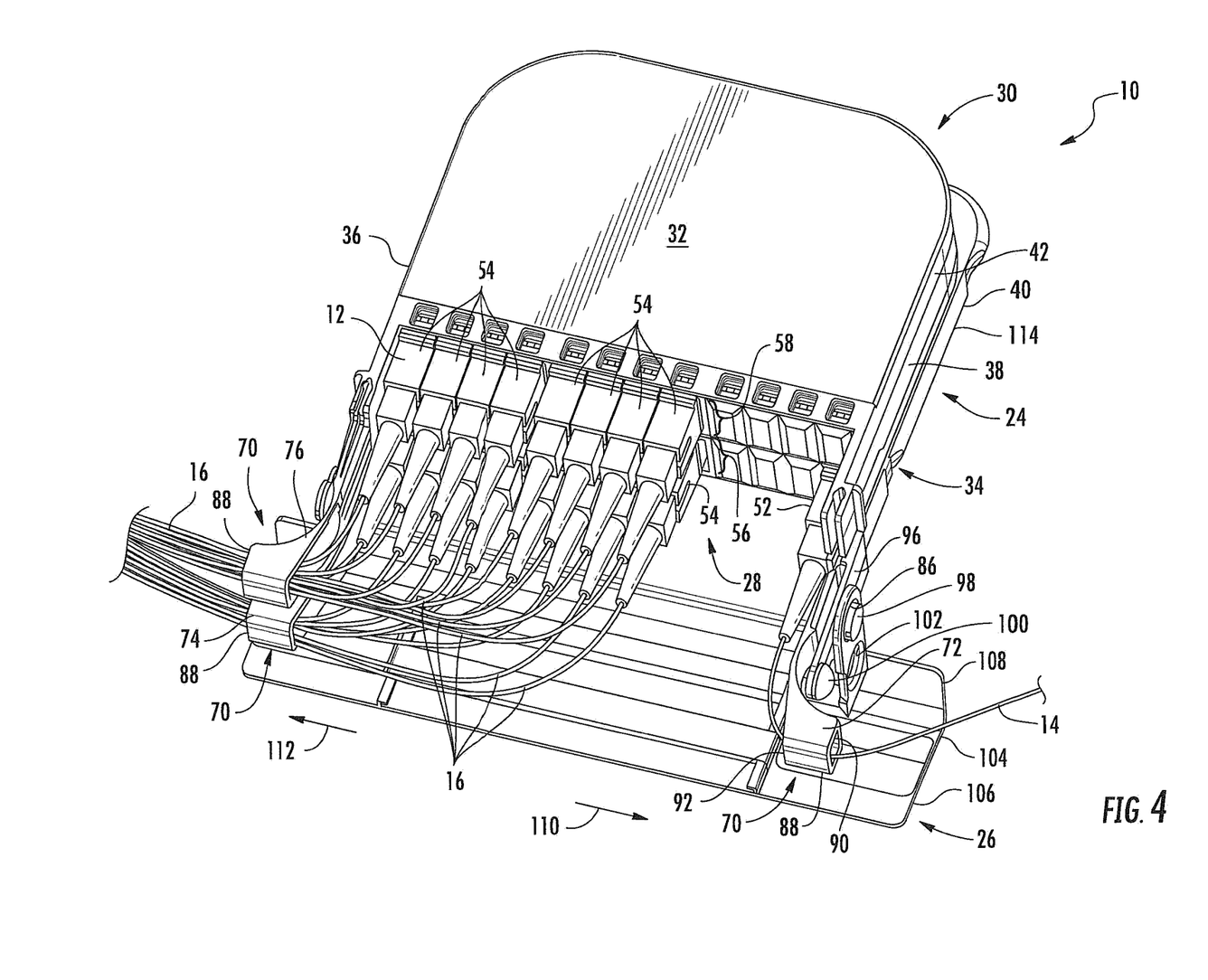
FIG. 4 is a perspective view of the fiber optic module of FIG. 3 with the handle in the open position.

The fiber optic module 10 has a body 24 and a handle 26 that is pivotally mountable to the body 24. Referring specifically to FIGS. 3 and 4, the body 24 has a front end 28, a back end 30, a top surface 32, a bottom surface 34, a first side 36, and a second side 38, and is made up of at least a first body section 40 and a second body section 42. In some embodiments, as will be described in more detail below, the body 24 may have more than two body sections 40, 42 (see e.g., FIG. 9 which depicts an embodiment with three body sections).

Figure 9:
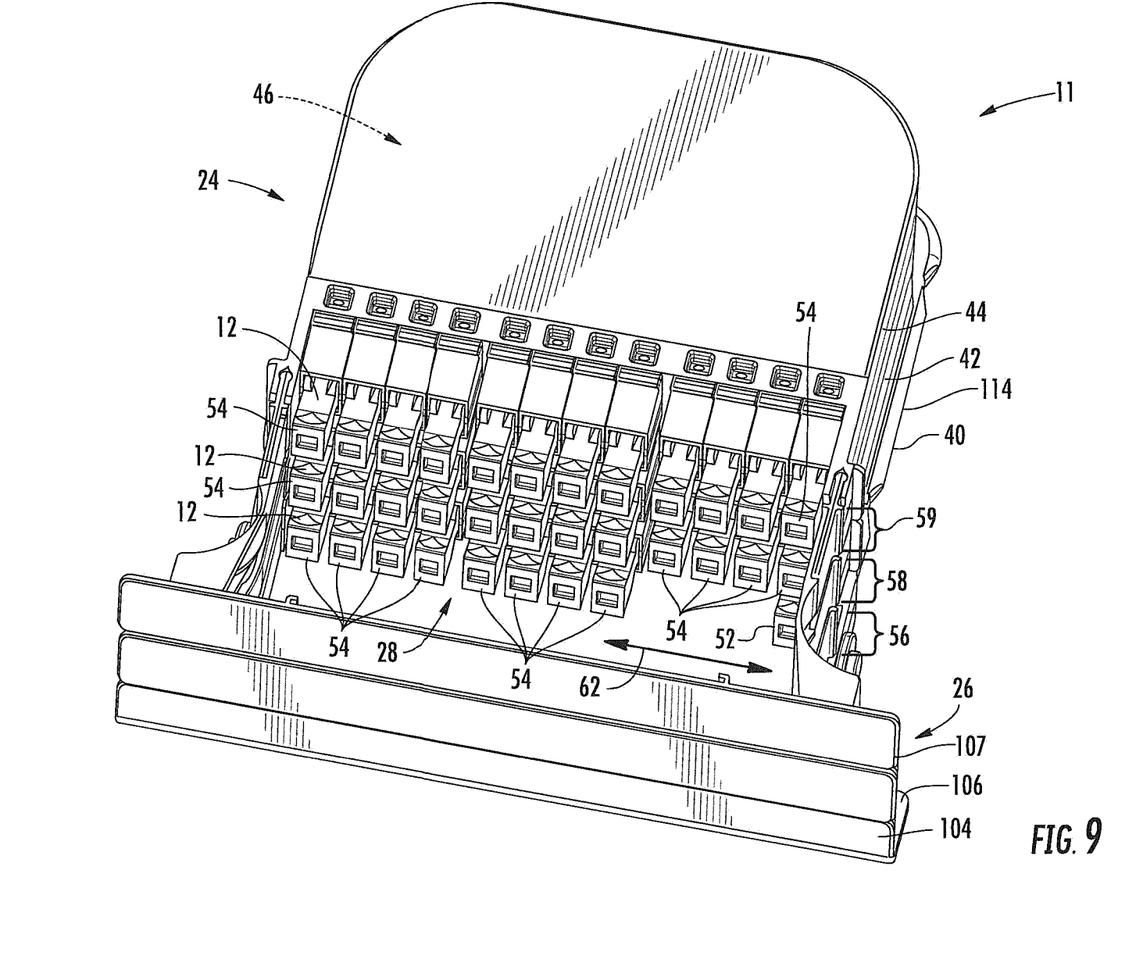
FIG. 9 is a perspective view of another embodiment of a fiber optic module for use in a fiber optic terminal in accordance with the present disclosure.

The body sections 40, 42 are in stacked alignment with each other. In other words, the first and second body sections 40, 42 are positioned one on top of the other. In the embodiment of FIG. 9, the first, second, and third body sections 40, 42, 44 are positioned one on top of the other. In some embodiments, the body sections 40, 42, 44 are a single unitary member while in other embodiments the body sections 40, 42, 44 are separate members that are coupled or secured together, for example, by a snap fit.

Figure 5:
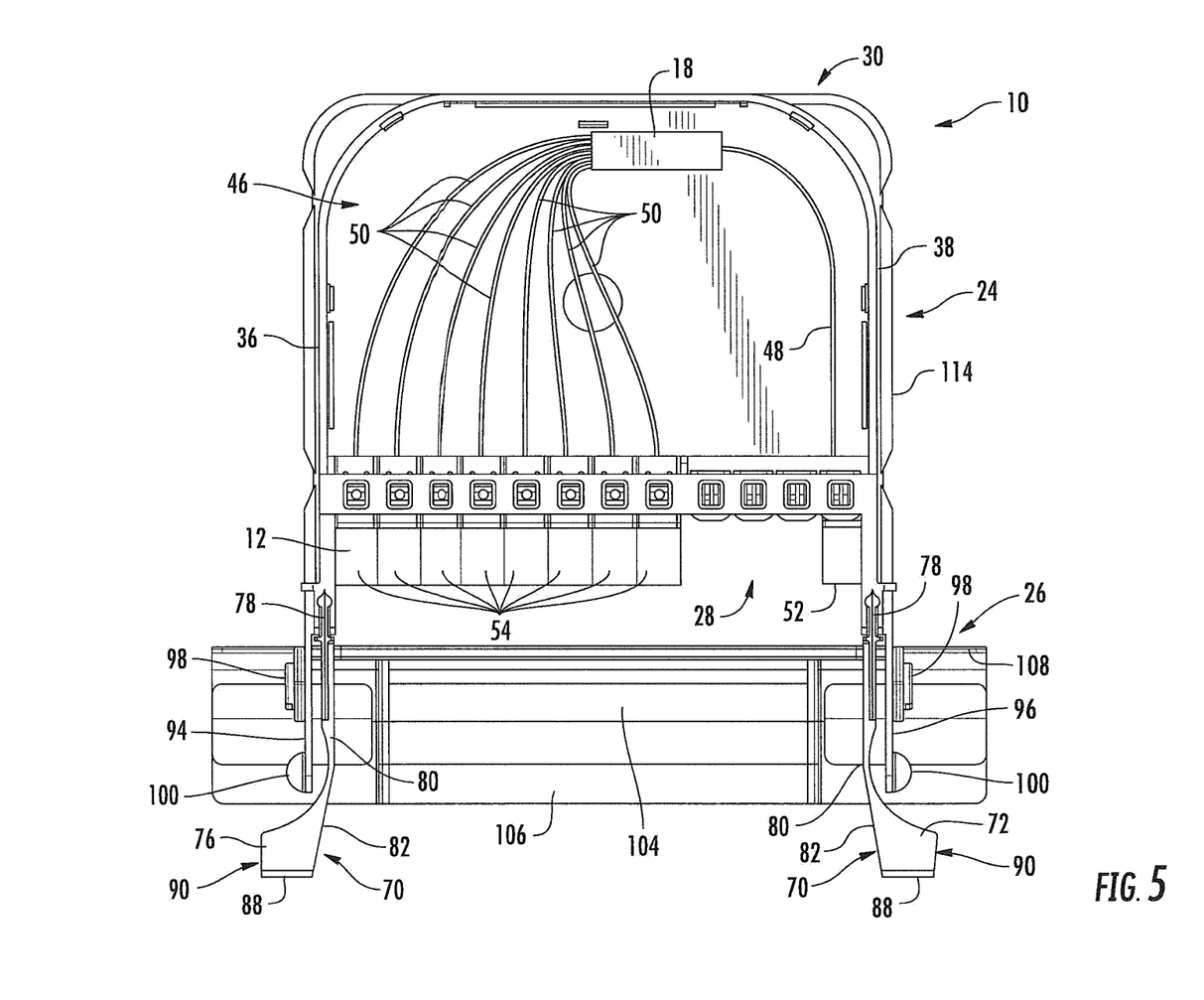
FIG. 5 is a top view of the fiber optic module of FIG. 3 with the handle in the open position and the input and distribution cables removed for clarity.

Referring again to FIGS. 3-6, the first and second body sections 40, 42 define an internal volume 46 (FIGS. 5 and 6) that houses one or more optical elements, such as an optical splitter 18 (FIG. 5). In other embodiments, the internal volume 46 may house other elements in addition to or in place an optical splitter 18, such as a splice storage area, cable storage components, fiber storage components, pass-through fiber components, parking components, and splice components, as well as optical fibers 48, 50 for coupling the input adapter 52 and the output adapters 54 to the one or more components, such as the splitter 18, as illustrated in FIG. 5.

Referring again to FIGS. 3-6, each body section 40, 42 includes adapters 12 for operably coupling connectorized optical fibers 14, 16 (or cables having optical fibers therein) to the optical element in the internal volume 46. In the embodiment illustrated in FIGS. 3 and 4, for example, the first body section 40 includes a first group 56 of adapters 12 and the second body section 42 includes a second group 58 of adapters 12. Both groups 56, 58 of adapters 12 are located at the front end 28 of the body 24 so that they are accessible to a user when the fiber optic module 10 is installed in a frame 20 (FIG. 11), as will be described in more detail below.

The first group 56 of adapters 12 of the first body section 40 includes the input adapter 52 and a plurality of output adapters 54. Thus, both the input and output functionality for the first body section 40 is positioned at the front end 28 of the body 24. As used herein, the term "input adapter" means an optical connector adapter that is positioned on one of the body sections 40, 42, 44 to receive a connector for inputting an optical signal to the optical element or optical elements, and the term "output adapter" means an optical connector adapter that is positioned on one of the body sections 40, 42, 44 to output an optical signal from the optical element or optical elements.

In the embodiment illustrated in FIGS. 3-6, the first group 56 of adapters 12 includes one input adapter 52 and eight output adapters 54. In other embodiments, however, the first group 56 of adapters 12 may include any other number of input and output adapters 52, 54. For example, the first group 56 of the first body section 40 may include an additional input adapter located adjacent to the input adapter 52, as illustrated by the dashed lines 60 shown in FIG. 3. Thus, the first group 56 of adapters 12 would have two input adapters 52 and eight output adapters 54. The input and output adapters 52, 54 of the first group 56 are aligned in a single row on the on the front end 28 of the body 24 and form part of the first body section 40.

In some embodiments, the input adapter 52 is spaced from the output adapters 54 by a distance 62 as an error proofing feature to assist a technician in correctly identifying the input adapters 52 from the output adapters 54, and vice versa. In some embodiments, for example, the input adapter 52 is spaced from the adjacent output adapter 54 by a distance 62 that is greater than a distance between adjacent output adapters 54. In other embodiments, the distance 62 between the input adapter 52 and the output adapters 54 may be at least as long as the width 64 of one of the output adapters 54. In some cases, the distance 62 between the input adapter 52 and the output adapters 54 is at least as long as the width 64 of two of the output adapters 54.

The second body section 42 also includes a group 58 of adapters 12, also referred to herein as the second group 58 of adapters 12. The second group 58 of adapters 12 includes a plurality of output adapters 54 and may not include any input adapters 52. In the embodiment illustrated in FIGS. 3 and 4, for example, the second group 58 of adapters 12 includes eight output adapters 54 that are aligned in a single row. In this embodiment, the second group 58 of adapter 12 does not include an input adapter 52.

Referring specifically to FIG. 5, the internal volume 46 of the body 24 is configured such that the optical element, such as the optical splitter 18 of FIG. 5, may be coupled to the input and output adapters 52, 54 of the first and second body sections 40, 42 via input and output splitter fibers 48, 50. The first body section 40 defines a first portion of the internal volume 46 and the second body section 42 defines a second portion of the internal volume 46, and the first and second portions are open to each other to allow the input splitter fibers 48 and the output splitter fibers 50 to be routed from the optical component (e.g., optical splitter 18) to the adapters 52, 54 on both the first body section 40 and the second body section 42.

The total number of input and output adapters 52, 54 from both the first and second body sections 40, 42 may correspond to the requirements of the optical element in the internal volume 46. For example, the optical element may be an optical splitter having a 1×4, 1×8, 1×16, 1×32, 2×4, 2×8, 2×16 or 2×32 split ratio. The total number of input adapters 52 from the first and second body sections 40, 42 may correspond to the number of input fibers 48 of the splitter (e.g., 1 input fiber for the 1×4, 1×8, 1×16, and 1×32 splitters and 2 input fibers for the 2×4, 2×8, 2×16 or 2×32 splitters) and the total number of output adapters 54 from the first and second body portions 40, 42 may correspond to the number of output fibers 50 of the splitter (e.g., 4 output adapters for the 1×4 and 2×4 splitters, 8 output adapters for the 1×8 and 2×8 splitters, 16 output adapters for the 1×16 and 2×16 splitters, and 32 output adapters for the 1×32 and 2×32 splitters). In the embodiment illustrated in FIGS. 3-6, for example, the fiber optic module 10 includes an optical splitter 18 having a 1×16 split ratio. As such, the first body section 40 includes one input adapter 52 and the first and second body portions 40, 42 include a total of sixteen output adapters 54. In embodiments involving an optical element requiring two input signals, there may be two input adapters 52 which may both be located on the first body section 40, may both be located on the second body section 42, or one input adapter 52 may be located on the first body section 40 and the other input adapter 52 may be located on the second body section 42.

Figure 10:
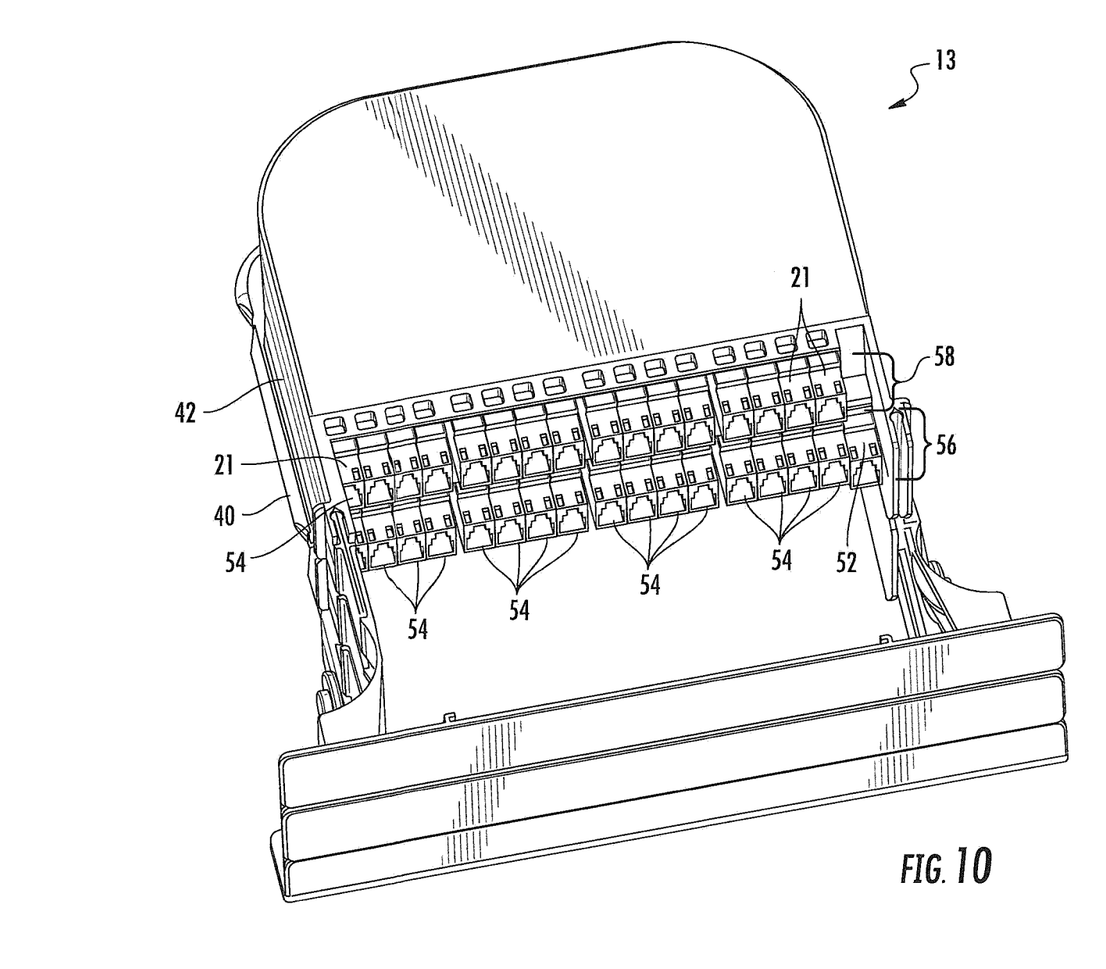
FIG. 10 is a perspective view of yet another embodiment of a fiber optic module for use in a fiber optic terminal in accordance with the present disclosure.

Referring momentarily to FIG. 10, the fiber optic module 13 of this embodiment includes one input adapter 52 and thirty-two output adapters 54. Thus, the optical element (not shown) in the fiber optic module 13 may require one input fiber (not shown) and thirty-two output fibers (not shown).

The input and output adapters 52, 54 may be any suitable type of connector adapter, such as, for example, an LC connector adapters or an SC connector adapters. As examples, LC connector adapters are illustrated in FIGS. 3-6 and SC adapters are illustrated on the fiber optic module 13 in FIG. 10. The adapters 52, 54 are configured to receive connectorized ends of input and output optical fibers 14, 16 (FIGS. 3 and 4). The adapters 52, 54 may be factory installed in the modules 10 or may be installed in the field by a technician.

For purposes of uniformity, the first body section 40 may include all of the input adapters 52 and the second body section 42 may include only output adapters 54, as illustrated in FIGS. 3-6, 9 and 10. Thus, a technician can know to look to the first body section 40 to locate the input adapter 52 or input adapters 52 in those embodiments that include more than one input adapter 52. As such, the second group 58 of adapters 12 will typically include a greater number of output adapters 54 than the first group 56 of adapters 12.

As discussed above, the body 24 may be made up of more than two body sections. Referring again to FIG. 9, for example, the body 24 of the fiber optic module 11 is made up of a first body section 40, a second body section 42, and a third body section 44. The body sections 40, 42, 44 are in stacked alignment with each other. In some embodiments, the body sections 40, 42, 44 are a single unitary member while in other embodiments the body sections 40, 42, 44 are separate members that are coupled together, for example, by a snap fit.

The first, second, and third body sections 40, 42, 44 define an internal volume 46 that houses one or more optical elements, which may be a splitter and/or another optical element as discussed above.

Each of the first, second, and third body sections 40, 42, 44 includes adapters 12 for operably connecting connectorized optical fibers or cables to the optical element (not shown) in the internal volume 46. In the embodiment illustrated in FIG. 9, the first body section 40 includes a first group 56 having one input adapter 52 and eight output adapters 54, the second body section 42 includes a second group 58 of sixteen output adapters 54, and the third body section 44 includes a third group 59 of sixteen output adapters 54. All groups 56, 58, 59 of adapters are located at the front end 28 of the body 24 so that they are accessible to a user when the fiber optic module 10 is installed in a frame 20, as will be described in more detail below with reference to FIG. 11. Thus, both the input and output functionality are positioned at the front end 28 of the body 24.

The input and output adapters 52, 54 of the first, second, and third groups 56, 58, 59 are aligned in rows on the on the front end 28 of the body 24. The first group 56 of adapters forms part of the first body section 40, the second group 58 of adapters forms part of the second body section 42, and the third group 59 of adapters forms part of the third body section 44. As noted above, the input adapter 52 (or input adapters 52) of the first body section 40 may be spaced from the output adapters 54 of the first body section 40 by a distance 62 as an error proofing feature to assist a technician in correctly identifying the input adapters 52 from the output adapters 54, and vice versa. In some embodiments, the distance 62 between the input adapter 52 and the adjacent output adapter 54 includes an insignia (not shown) to indicate the location of the input and output adapters 52, 54.

As discussed above, the total number of input and output adapters 52, 54 from the first, second, and third body sections 40, 42, 44 may correspond to the requirements of the optical element in the internal volume 46. For example, in the embodiment illustrated in FIG. 9 the optical element may be an optical splitter (not shown) having a 1×32 split ratio. In this embodiment, the first, second, and third body sections 40, 42, 44 combined include one input adapter 52 located on the first body section 40 and the first, second, and third body sections 40, 42, 44 include 32 output adapters 54. For purposes of uniformity, the input adapter 52 is located on the first body section 40 and the second and third body sections include only output adapters 54. Thus, a technician can know to look to the first body section 40 to locate the input adapter 52.

Referring again to FIGS. 3-6, each body section 40, 42 includes at least one fiber routing arm 70 for routing the connectorized input and distribution fibers 14, 16 to and from the input and distribution adapters 52, 54 of that body section 40, 42. For example, referring specifically to FIG. 4, the first body section 40 includes a first fiber routing arm 72 for routing the connectorized input fiber 14 to the input adapter 52 of the first group 56 and a second fiber routing arm 74 for routing the connectorized distribution fibers 16 away from the output adapters 54 of the first group 56. The second body section 42 may also include two fiber routing arms. However, in the embodiments illustrated in FIGS. 3-6, the second body section 42 includes only one fiber routing arm 76 for routing connectorized distribution fibers 16 away from the output adapters 54 of the second group 58. In some embodiments, as illustrated in FIGS. 3-6, the second body section 42 only requires one fiber routing arm 76 because the second body section 42 only includes output adapters 54 and the connectorized distribution fibers 16 that are connected to the output adapters 54 are routed in the same direction 112 away from the front end 28 of the module 10. The second body section 42 may also include a second fiber routing arm (not shown) but this arm may not be necessary and can be removed in some embodiments.

Figure 6:
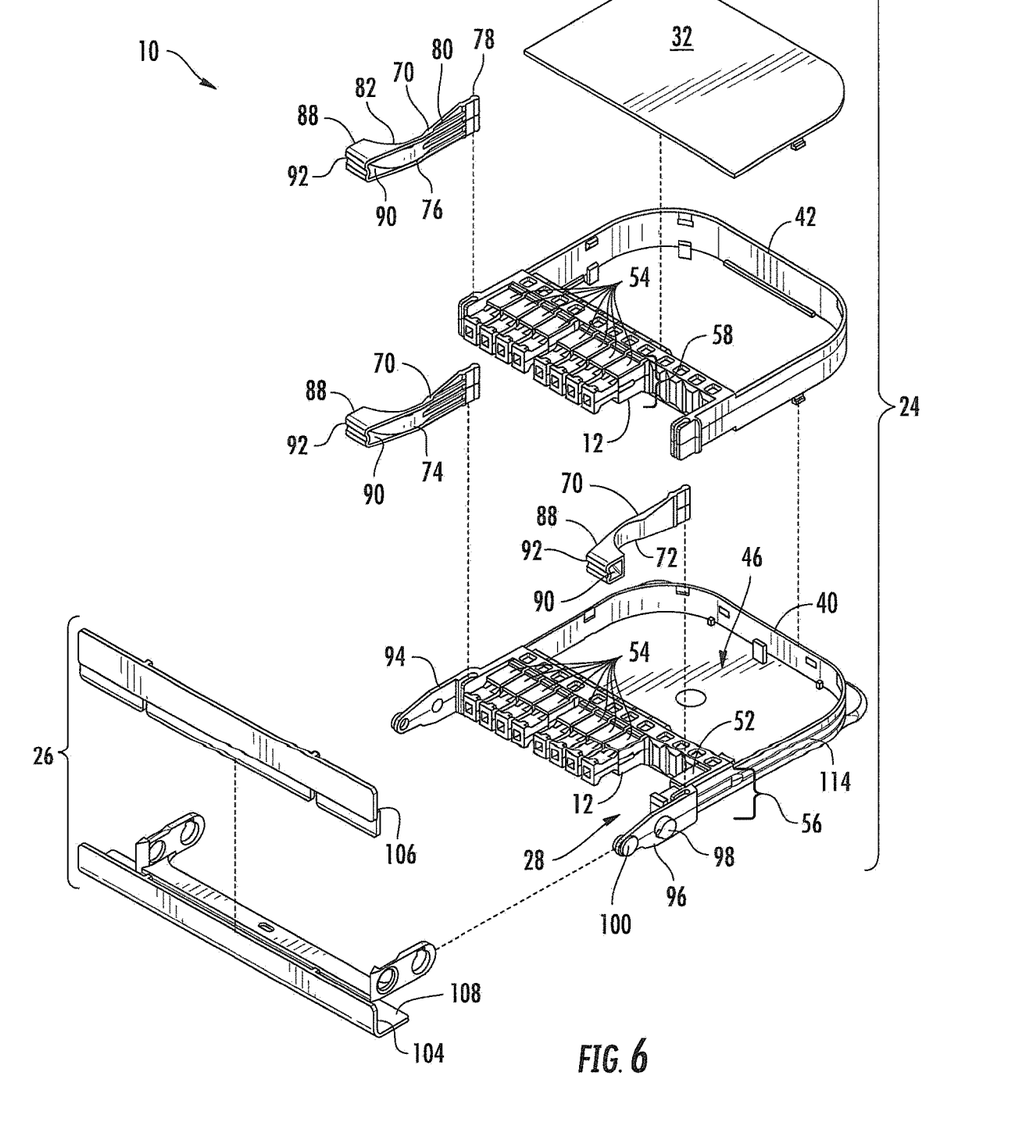
FIG. 6 is an exploded view of the fiber optic module of FIG. 3.

Referring specifically to FIGS. 5 and 6, the fiber routing arms 70 includes a coupling portion 78, a body portion 80, and a curved portion 82 having a fiber retaining element 88. The fiber routing arms 70 may be removably attached to the respective body sections 40, 42, 44 by the coupling portion 78. For example, the coupling portion 78 may include a cylindrical protrusion that slides within a corresponding cylindrical void in the corresponding body portion. Other mechanisms to removably secure the fiber routing arms 70 to the corresponding body sections can be used in other embodiments. The benefits of having removable fiber routing arms 70 include the ability to install only those fiber routing arms 70 that are required for a given application (for example, if the input and distribution connectorized fibers 14, 16 are only to be directed to one side of the fiber optic module 10, or if a particular body section only includes output adapters 54). Another benefit is the ability to replace damages fiber routing arms 70 if needed.

While the fiber routing arms 70 are removable in some embodiments, the fiber routing arms 70 may also be integral with the corresponding body section in other embodiments.

The body portion 80 and the curved portion 82 of each fiber routing arm 70 may be more flexible than the coupling portion 78 of the fiber routing arm 70. For example, in some embodiments the body portion 80 and curved portion 82 may be thinner than the coupling portion 78 or may be made of a different material than the coupling portion 78. The curve portion 82 is curved to maintain an appropriate bend radius for the connectorized input and distribution fibers 14, 16. The flexible nature of the linear and curved portions 80, 82 may provide extra protection to the connectorized input and distribution fibers 14, 16. For example, a technician may accidentally apply an excessive force to the connectorized input and distribution fibers 14, 16 which may have the tendency to pull and damage the connectorized input and distribution fibers 14, 16 by bending the fibers 14, 16 past their acceptable bend radius. The curvature of the curved portion 82 and the flexible nature of the body portion and the curved portion 80, 82 may provide additional protection to the fibers 14, 16 in this situation.

The fiber routing arms 70 are aligned with respective body sections so that the connectorized input and output fibers 14, 16 of each body section are routed separately from the connectorized input and output fibers 14, 16 of the other body sections. Referring specifically to FIG. 4, the first body section 40 includes two fiber routing arms 72, 74 and are aligned with the first group 56 of adapters to route the connectorized input and distribution fibers 14, 16 that are operably coupled to the first group 56 of adapters. The second body section 42 includes a single fiber routing arm 76 to route the connectorized distribution fibers 16 that are operably coupled to the second group 58 of adapters. Thus, the connectorized input and distribution fibers 14, 16 of each body section 40, 42 are routed independently of the connectorized input and distribution fibers 14, 16 of the other body sections. The independent routing of these groups of fibers assists with the management of the fibers and is helpful to allow a technician to location and changing fibers as needed.

The fiber routing arms 70 also have a fiber retaining element 88 at the free end of the fiber routing arms 70 to retain a portion of the connectorized input and distribution fibers 14, 16 being routed by the fiber routing arm 70. In the embodiment illustrated in FIG. 4, for example, the fiber routing arms 70 each include a fiber retaining element 88 in the shape of a rectangular cavity 90 having a slot 92 for inserting and holding a portion of the connectorized fibers 14, 16.

Referring now specifically to FIG. 5, the first body section 40 includes a first arm 94 extending from the first side 36 and a second arm 96 extending from the second side 38. The first and second arms 94, 96 may extend beyond the front end 28 to provide some protection to the input and output adapters 52, 54. The first and second arms 94, 96 are configured to hold the removable handle 26, as will be described in more detail below.

The first and second arms 94, 96 each include a hinge protrusion 98 and a locking protrusion 100. The hinge protrusions 98 extend laterally from the first and second arms 94, 96 and provide a hinging point for the removable handle 26. The hinge protrusions 98 may be any suitable shape and size, such as, for example, a cylindrical shape.

The locking protrusions 100 of the first and second arms 94, 96 are positioned near a freestanding end of the first and second arms 94, 96. The locking protrusions 100 removably lock the handle 26 in the closed position (the closed position, also called the locked position, is illustrated in FIG. 3). In the embodiments illustrated herein, the locking features 100 comprise a semicircular bulge on the exterior surface of the first and second arms 94, 96, but the locking features may be any other physical feature that releasably holds the handle 26 to the first and second arms 94, 96 when the handle 26 is in the closed or locked position (FIG. 3). The locking features 100 engage second openings 102 of the handle 26 when the handle 26 is in the closed position to releasably hold the handle 26 in the closed position.

The handle 26 includes routing surfaces 104, 106 to manage and direct the connectorized input and distribution fibers 14, 16. Referring specifically to FIGS. 3 and 4, the handle 26 includes a first fiber routing surface 104 and a second fiber routing surface 106. The first and second fiber routing surfaces 104, 106 extend perpendicularly from a horizontal body portion 108 of the handle 26. The first and second fiber routing surfaces 104, 106 provide surfaces against which the connectorized input and distribution fibers 14, 16 rest when coupled to the input and output adapters 52, 54. The first and second fiber routing surfaces 104, 106 help to direct the connectorized input and distribution fibers 14, 16 away from the module 10 in first or second lateral directions 110, 112 to assist with fiber management. In some embodiments, the horizontal body portion 108 of the handle 26 also supports the connectorized input and distribution fibers 14, 16 from excessive sagging when connected to the input and output adapters 52, 54.

The handle 26 is pivotable with respect to the first body section 40 between an open position (the open position is illustrated in FIG. 4) to allow access to the first and second groups 59, 58 of adapters and a closed position (the closed position is illustrated in FIG. 3) to route and protect the connectorized input and distribution fibers 14, 16. When the handle 26 is in the closed position, the first fiber routing surface 104 is aligned with the first group of adapters 56 and the first body section 40 and the second fiber routing surface 106 is aligned with the second group of adapters 58 and the second body section 42. Thus, the first fiber routing surface 104 is positioned to route the connectorized input and distribution fibers 14, 16 coupled to the first group 56 of adapters and the second fiber routing surface 106 is positioned to route the connectorized distribution fibers 16 coupled to the second group 58 of adapters. When the handle is in the open position (FIG. 4), a technician can add or remove the connectorized input and distribution fibers 14, 16 from the input and output adapters 52, 54.

Figure 7:
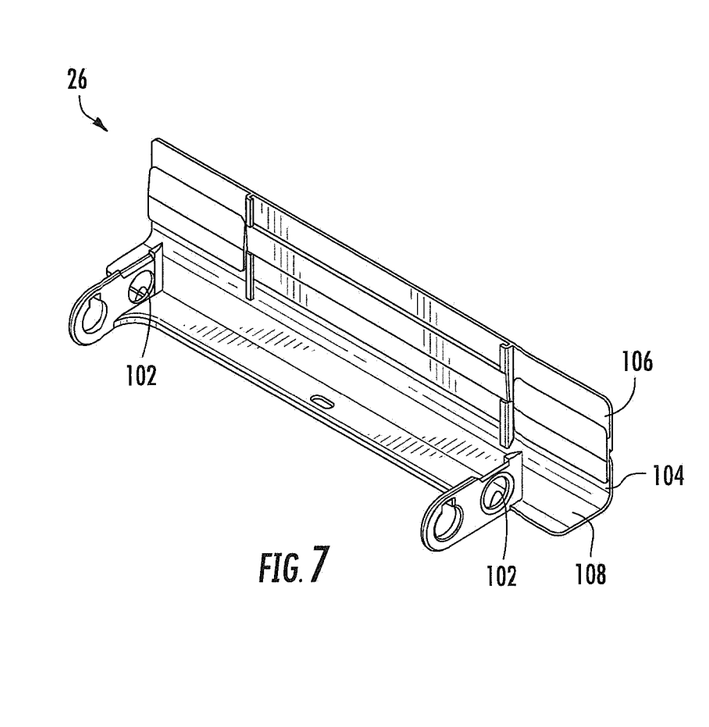
FIG. 7 is a perspective view of the handle of the fiber optic module of FIG. 3.
Figure 8:
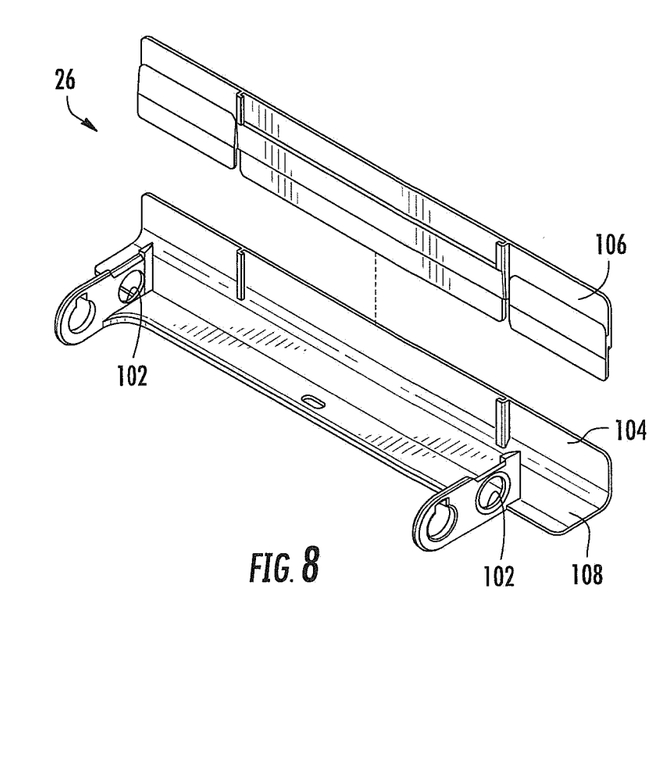
FIG. 8 is an exploded view of the handle of FIG. 7.

Referring now to FIGS. 6-8, the second fiber routing surface 106 may be removably coupled to the first fiber routing surface 104. In embodiments that include additional body sections, additional fiber routing surfaces (not shown) may be added to the first and second routing surfaces 104, 106 to correspond to the additional body sections. Thus, for example, in the embodiment illustrated in FIG. 9, which includes three body sections, the handle 26 includes three fiber routing surfaces 104, 106, 107. The third fiber routing surface 107 is aligned with the third group 59 of adapters and the third body section 44 when the handle 26 is in the closed position (the closed position is illustrated in FIG. 9). Thus, the third fiber routing surface 107 is positioned to route connectorized distribution fibers 16 (not shown in FIG. 9) coupled to the adapters of the third body section 44.

Figure 11:
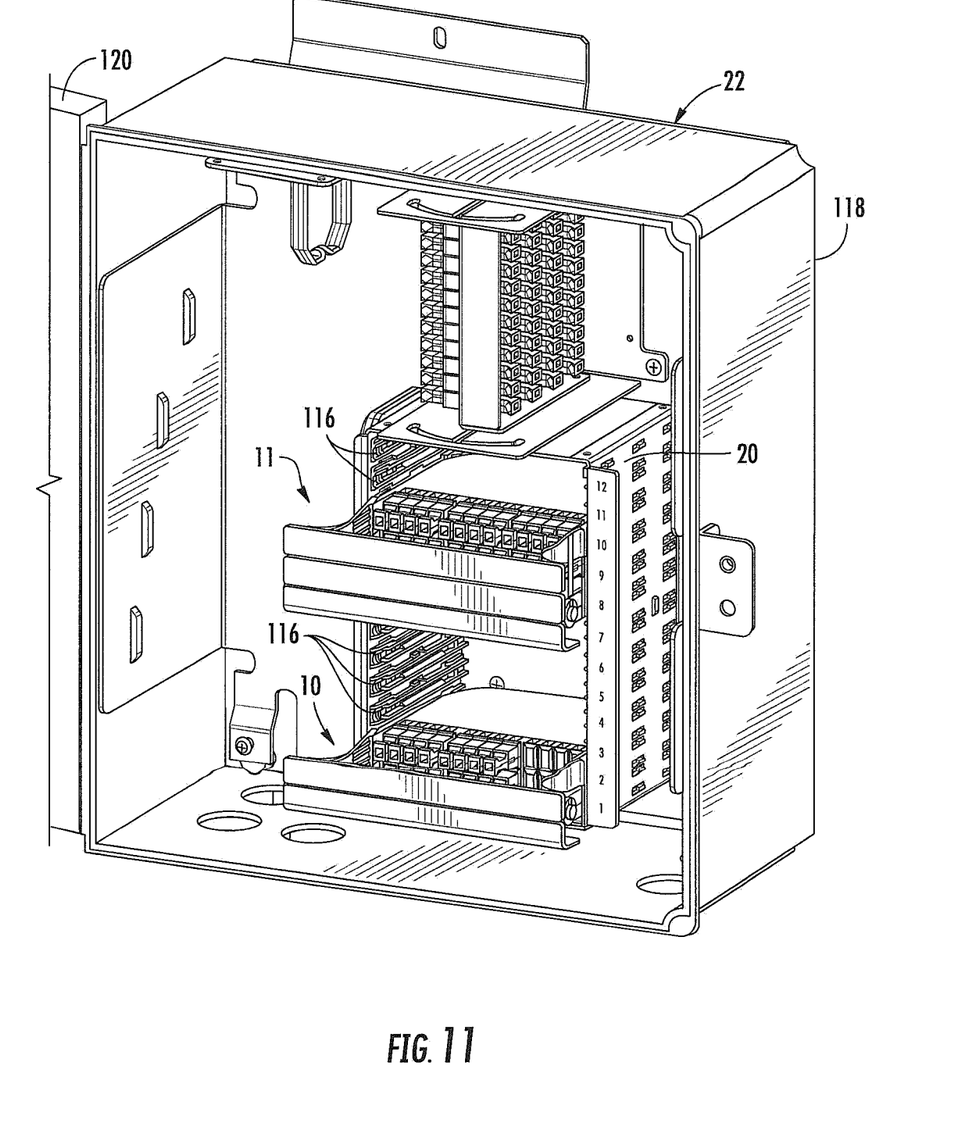
FIG. 11 is a perspective view of a fiber optic terminal having a frame therein that includes the fiber optic module of FIG. 3 and the fiber optic module of FIG. 9.

Referring again to FIGS. 3-6 and 9, in some embodiments one or more of the first, second, or third body sections 40, 42, 44 includes a flange 114 for securing the fiber optic module 10 in a frame 20 (FIG. 11). FIG. 11 is a perspective view of a fiber optic terminal 22 that includes a frame 20 for holding modules 10, 11. The fiber optic module 10 of FIG. 3 is positioned in the bottom of the frame 20 and the fiber optic module 11 of FIG. 9 is positioned in the top of the frame 20.

The frame 20 includes tracks 116 that removably accept the modules 10, 11 to allow for increased customization of the fiber optic terminal 22. The fiber optic terminal 22 may include a base 118 and a cover 120 that is pivotally coupled to the base 118. The frame 20 having the tracks 116 is located within an interior volume of the terminal 22 and is configured to removably accept the modules 10, 11 to customize the fiber optic terminal 22 as needed for a particular application.

The tracks 116 may be positioned within the frame 20 so that the modules 10, 11 are aligned in columns and/or rows. To provide for optical fiber routing efficiency and ease of use, columns of modules 10, 11 holders may be position adjacent to one another and rows of module holders may be horizontally aligned so that the modules 10, 11 form organized input and distribution fields. Each of the modules 10, 11 may be separately and independently inserted, removed, and repositioned in the tracks 116 making the fiber optic terminal 22 modular and variably configurable. The module 10, which includes two body sections 40, 42, occupies the space of two sets of tracks 116 when inserted into the frame 20. The module 11, which includes three body sections 40, 42, 44, occupies the space of three sets of tracks 116 when inserted into the frame 20.

While the fiber optic terminal 22 illustrated in FIG. 11 includes a frame 20 having only one column of tracks 116, in other embodiments the fiber optic terminal 22 may include several columns of tracks 116 in one or more frames 20. In some embodiments, the tracks 116 are aligned in the frame 20 (or frames 20) such that when two or more modules 10, 11 are positioned in the tracks 116, the input and distribution adapters 52, 54 of the modules 10, 11 are aligned to form input and distribution fields in the fiber optic terminal 22. In traditional terminals, the input and distribution fields are fixed and fully pre-configured. In other words, a terminal that will service 132 clients will have a fixed distribution field having spaces for 132 output adapters. The fixed distribution field typically requires a large amount of space in the terminal and thus requires a larger terminal with additional costs associated with installation. In addition, the fixed distribution field is a separate element from the splitter modules. In contrast, the fiber optic terminal 22 of the present disclosure need not include fixed input and distribution fields because the removable modules 10, 11 include input and distribution adapters 52, 54 that together form input and distribution fields when the removable modules 10, 11 are inserted into the tracks 116. Thus, the size of the input and distribution fields in the fiber optic terminal 22 are adaptable according to network demand. Each new module 10, 11 that is added to the fiber optic terminal 22 includes the necessary input and distribution adapters 52, 54. As such, the input and distribution capacity of the fiber optic terminal 22 is dynamically adjusted based on the number of modules 10, 11 present in the fiber optic terminal 22. For the avoidance of doubt, the optical terminal 22 may also include dedicated input and distribution fields in addition to the frame 20 if needed for a particular application.

The modules may be reversible in that they can be inserted into the tracks 116 so that the input adapter 52 or adapters 52 are on the left side of the fiber optic terminal 22, as illustrated in FIG. 11, or so that the input adapter 52 or adapters 52 are on the right side of the fiber optic terminal 22. The reversible nature of the module allows for customization of the location of the input adapters 52 and the output adapters 54 in the fiber optic terminal 22.

Figure 12:
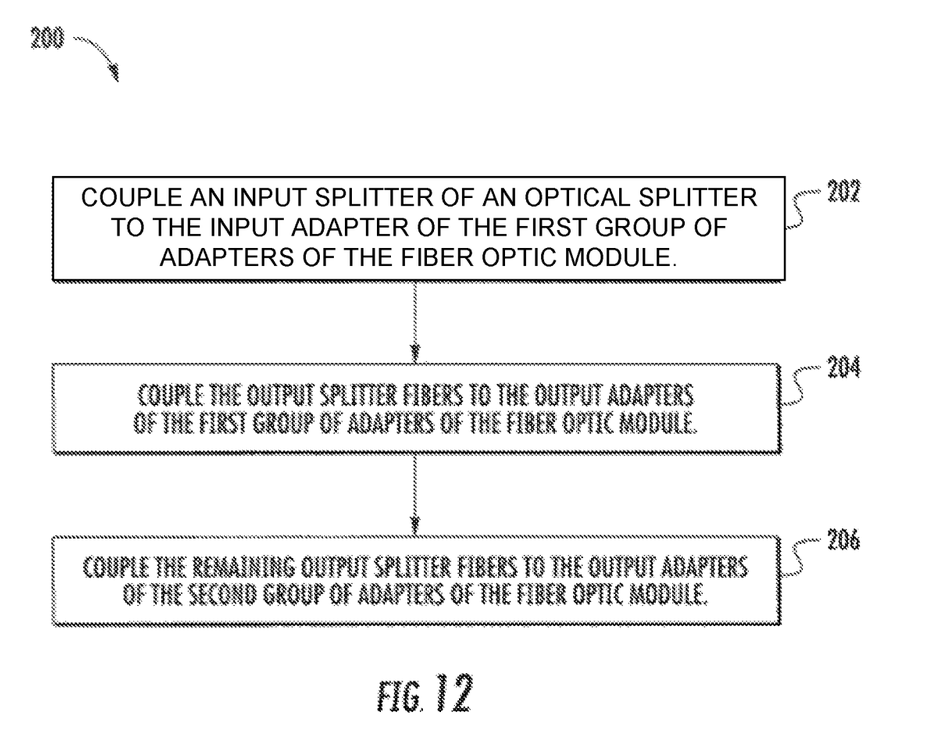
FIG. 12 is a block diagram illustrating a method of forming a fiber optic module for use in a fiber optic terminal.

FIG. 12 is a block diagram illustrating a method 200 of forming a fiber optic module 10 for use in a fiber optic terminal 22. An input splitter fiber 48 of the optical splitter 18 is operably coupled to the input adapter 52 of the first group 56 of adapters of the fiber optic module 10, as illustrated at block 202. The output splitter fibers 50 are operably coupled to the output adapters 54 of the first group 56 of adapters of the fiber optic module 10, as illustrated at block 204. The remaining output splitter fibers 50 are operably coupled to the output adapters 54 of the second group 58 of adapters of the fiber optic module 10, as illustrated at block 206. As discussed above, the fiber optic module 10 includes a first body section 40 comprising the first group 56 of adapters and a second body section 42 comprising the second group 58 of adapters. The first and second body sections 40, 42 are in stacked alignment and define an internal volume 46 that houses the splitter 18.

The term "splitter" as used herein should be understood to include any form of passive or active optical splitting, coupling, or wavelength managing device, including without limitation, a passive optical splitter, fused biconic taper coupler (FBT), wave length division multiplexer/demultiplexer (WDM), coarse wavelength division multiplexer/demultiplexer (CWDM), dense wave division multiplexer/demultiplexer (DWDM), and the like. The terms "cable storage components" as used herein should be understood to include any repository for holding excess cable length, including without limitation, reels, cable channels, flanges, tie-wraps, slots, hubs and the like. The term "fiber storage components" as used herein should be understood to include any repository for holding excess fiber length, including without limitation, routing rings, tie-wraps, slots, channels, storage flanges, hubs and the like. The term "pass-through fiber components" as used herein should be understood to include any feature that couples a first fiber to a second fiber without substantial modification to the signal carried by the first and second fibers. The term "parking components" as used herein should be understood to include any feature for temporarily holding a connector, or connectorized or unconnectorized fiber. The term "splice components" as used herein should be understood to include any feature for holding or protecting a permanent connection between two optical fibers, including without limitation, heat shrink splice protectors, crimp splice protectors, and the like.

The terms "left side," "right side," "upward," "downward," "top," "bottom," "horizontal," "vertical," "lateral" and similar terms are used for convenience of describing the attached figures and are not intended to limit this description. For example, the terms "left side" and "right side" are used with specific reference to the drawings are not intended to limit this description. Rather, the module 14 may be installed in other orientations in a reversible manner. For example, the module 14 may be installed in a closure such that the top surface 214 facing upward or facing downwards, to the right side, to the left side, or any other non-vertical direction.

It is to be understood that the disclosure is not to be limited to the specific embodiments disclosed and that modifications and other embodiments are intended to be included within the scope of the appended claims. It is intended that the present disclosure cover the modifications and variations of this disclosure provided they come within the scope of the appended claims and their equivalents. Although specific terms are employed herein, they are used in a generic and descriptive sense only and not for purposes of limitation.

What is claimed is:

1. A fiber optic module for use in a fiber optic terminal, comprising:
    a body having a front end and at least two body sections defining an internal volume, wherein each of the at least two body sections includes a respective group of adapters on the front end of the body, wherein the at least two body sections comprises a first body section and a second body section, and wherein the respective group of adapters comprises a first group of adapters on the first body section and a second group of adapters on the second body section;
    at least two fiber routing arms each extending from a respective one of the at least two body sections, wherein each of the at least two fiber routing arms includes a free end and a fiber retaining element at the free end, wherein the at least two fiber routing arms comprises a first fiber routing arm and a second fiber routing arm;
    an optical splitter positioned within the internal volume of the body; and
    a handle coupled to one of the at least two body sections, wherein the handle comprises a first fiber routing surface and a second fiber routing surface.

2. The fiber optic module of claim 1, wherein the handle is pivotable with respect to the first body section between an open position to allow access to the first and second groups of adapters and a closed position wherein the first fiber routing surface is aligned with the first body section and the second fiber routing surface is aligned with the second body section.

3. The fiber optic module of claim 2, wherein the second fiber routing surface is removably coupled to the first fiber routing surface.

4. The fiber optic module of claim 3, further comprising a first group of distribution fibers coupled to the first group of adapters, wherein the first fiber routing arm is aligned with the first group of adapters for routing the first group of distribution fibers.

5. The fiber optic module of claim 4, wherein the first fiber retaining element of the first fiber routing arm comprises a first fiber retaining loop for allowing the first set of distribution fibers to pass to the first group of adapters.

6. The fiber optic module of claim 3, further comprising a second group of distribution fibers coupled to the second group of adapters, wherein the second fiber routing arm is aligned with the second group of adapters for routing the second group of distribution fibers.

7. The fiber optic module of claim 6, wherein the fiber retaining element of the second fiber routing arm comprises a second fiber retaining loop for allowing the second group of distribution fibers to pass to the second group of adapters.

8. The fiber optic module of claim 1, wherein the first fiber routing arm is removably coupled to the first body section and wherein the second fiber routing arm is removably coupled to the second body section.

9. The fiber optic module of claim 8, wherein the first and second fiber routing arms comprise a compliant material.

10. The fiber optic module of claim 1, wherein the first group of adapters comprises at least one input adapter and a plurality of output adapters, and wherein the optical splitter comprises an input fiber and a plurality of output fibers, wherein the input fiber is coupled to the at least one input adapter and at least some of the output fibers are coupled to the plurality of output adapters.

11. The fiber optic module of claim 10, wherein the second group of adapters comprises a plurality of output adapters and wherein at least some of the output fibers of the optical splitter are coupled to the plurality of output adapters of the second group of adapters.

12. The fiber optic module of claim 11, wherein the second group of adapters comprises a greater number of the output adapters than the first group of adapters.

13. The fiber optic module of claim 1, wherein the first group of adapters comprises an input adapter and a plurality of output adapters, and wherein the input adapter is spaced from the plurality of output adapters by a distance that is greater than a distance between adjacent output adapters of the plurality of output adapters.

14. The fiber optic module of claim 13, wherein the distance between the input adapter and the plurality of output adapters comprises an insignia.

15. The fiber optic module of claim 1, wherein the first body section and the second body section are defined by a single unitary member.

16. The fiber optic module of claim 1, wherein the first body section and the second body section are defined by separate members that are coupled together.

17. The fiber optic module of claim 1, wherein the first body section comprises a first portion of the internal volume and the second body section comprises a second portion of the internal volume, wherein the first and second portions are open to each other.

18. The fiber optic module of claim 1, wherein the first body section comprises a flange for securing the fiber optic module in a frame.

19. A fiber optic module for use in a fiber optic terminal, comprising:
    a body having a front end, a first body section comprising a first group of adapters on the front end of the body, and a second body section comprising a second group of adapters on the front end of the body, wherein the first and second body sections define an internal volume;
    a first fiber routing arm extending from the first body section;
    a second fiber routing arm extending from the second body section;
    an optical splitter positioned within the internal volume of the body; and
    a handle coupled to the first body section, wherein the handle comprises a first fiber routing surface and a second fiber routing surface, and wherein the handle is pivotable with respect to the first body section between an open position to allow access to the first and second fiber groups of adapters and a closed position wherein the first fiber routing surface is aligned with the first body section and the second fiber routing surface is aligned with the second body section.

20. The fiber optic module of claim 19, wherein the second fiber routing surface is removably coupled to the first fiber routing surface.

21. The fiber optic module of claim 19, wherein the first group of adapters comprises at least one input adapter and a plurality of output adapters, and wherein the optical splitter comprises an input fiber and a plurality of output fibers, wherein the input fiber is operably coupled to the at least one input adapter and at least some of the output fibers are coupled to the plurality of output adapters.

22. The fiber optic module of claim 21, wherein the second group of adapters comprises a plurality of output adapters and wherein remaining output fibers of the optical splitter are coupled to the plurality of output adapters.

* * * * *